US008385053B2

(12) United States Patent
Shirasaka et al.

(10) Patent No.: US 8,385,053 B2
(45) Date of Patent: Feb. 26, 2013

(54) ELECTRONIC DEVICE

(75) Inventors: Hideo Shirasaka, Ome (JP); Tetsuhiko Fukazawa, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/037,218

(22) Filed: Feb. 28, 2011

(65) Prior Publication Data

US 2011/0249379 A1 Oct. 13, 2011

(30) Foreign Application Priority Data

Apr. 9, 2010 (JP) ................................. 2010-090528

(51) Int. Cl.
*H05K 5/00* (2006.01)

(52) U.S. Cl. .................................. 361/679.01
(58) Field of Classification Search .................. None
See application file for complete search history.

(56) References Cited

U.S. PATENT DOCUMENTS

| | | | |
|---|---|---|---|
| 6,104,451 A | 8/2000 | Matsuoka et al. | |
| 6,320,761 B1* | 11/2001 | Sabisch | 361/807 |
| 6,770,813 B1* | 8/2004 | Ramsagar et al. | 174/525 |
| 7,365,807 B2 | 4/2008 | Iwai | |
| 7,511,229 B2* | 3/2009 | Vlasak et al. | 174/267 |
| 7,551,458 B2* | 6/2009 | Carnevali | 361/807 |
| 7,583,515 B2* | 9/2009 | Chih-Min et al. | 361/807 |
| 7,940,532 B2* | 5/2011 | Willing et al. | 361/807 |
| 8,064,223 B2* | 11/2011 | Tachikawa | 361/807 |
| 2005/0115735 A1 | 6/2005 | Iwai | |
| 2007/0274057 A1* | 11/2007 | Fukumoto | 361/807 |
| 2008/0304244 A1* | 12/2008 | Hsieh | 361/810 |
| 2009/0040693 A1* | 2/2009 | Tanaka | 361/679 |
| 2009/0244821 A1 | 10/2009 | Hasegawa | |
| 2009/0303137 A1* | 12/2009 | Kusaka et al. | 343/702 |
| 2010/0027232 A1* | 2/2010 | Kasuya et al. | 361/807 |
| 2010/0073897 A1* | 3/2010 | Tachikawa | 361/807 |

FOREIGN PATENT DOCUMENTS

| | | |
|---|---|---|
| JP | 09-304755 | 11/1997 |
| JP | H11-338372 | 12/1999 |
| JP | 2005-130097 | 5/2005 |
| JP | 2008-020865 | 1/2008 |
| JP | 2008-083982 | 4/2008 |
| JP | 2008-281644 | 11/2008 |
| JP | 2009-237448 | 10/2009 |

(Continued)

OTHER PUBLICATIONS

Notice of Rejection mailed by the Japan Patent Office on May 24, 2011 in corresponding Japanese patent app. No. 2010-090528 in 6 pages.
Notice of Rejection mailed by the Japan Patent Office on Aug. 23, 2011 in corresponding Japanese patent app. No. 2010-090528 in 7 pages.

*Primary Examiner* — Lisa Lea Edmonds
*Assistant Examiner* — Xanthia C Cunningham
(74) *Attorney, Agent, or Firm* — Knobbe, Martens, Olson & Bear LLP

(57) ABSTRACT

According to one embodiment, an electronic device includes a housing and a plurality of ribs. The housing houses at least part of an electronic component. The ribs are arranged along a flat side surface of the electronic component in the housing such that the inner surface of the ribs faces the side surface. The ribs comprises a rib that faces the side surface of the electronic component, and another rib that is located on an edge side of the side surface compared to the rib and more distant from the side surface than the rib.

18 Claims, 10 Drawing Sheets

FOREIGN PATENT DOCUMENTS

| JP | 2009-273294 | 11/2009 |
| JP | 2010-009387 | 1/2010 |
| JP | 2010-072207 | 4/2010 |
| JP | 2010-238224 | 10/2010 |

* cited by examiner

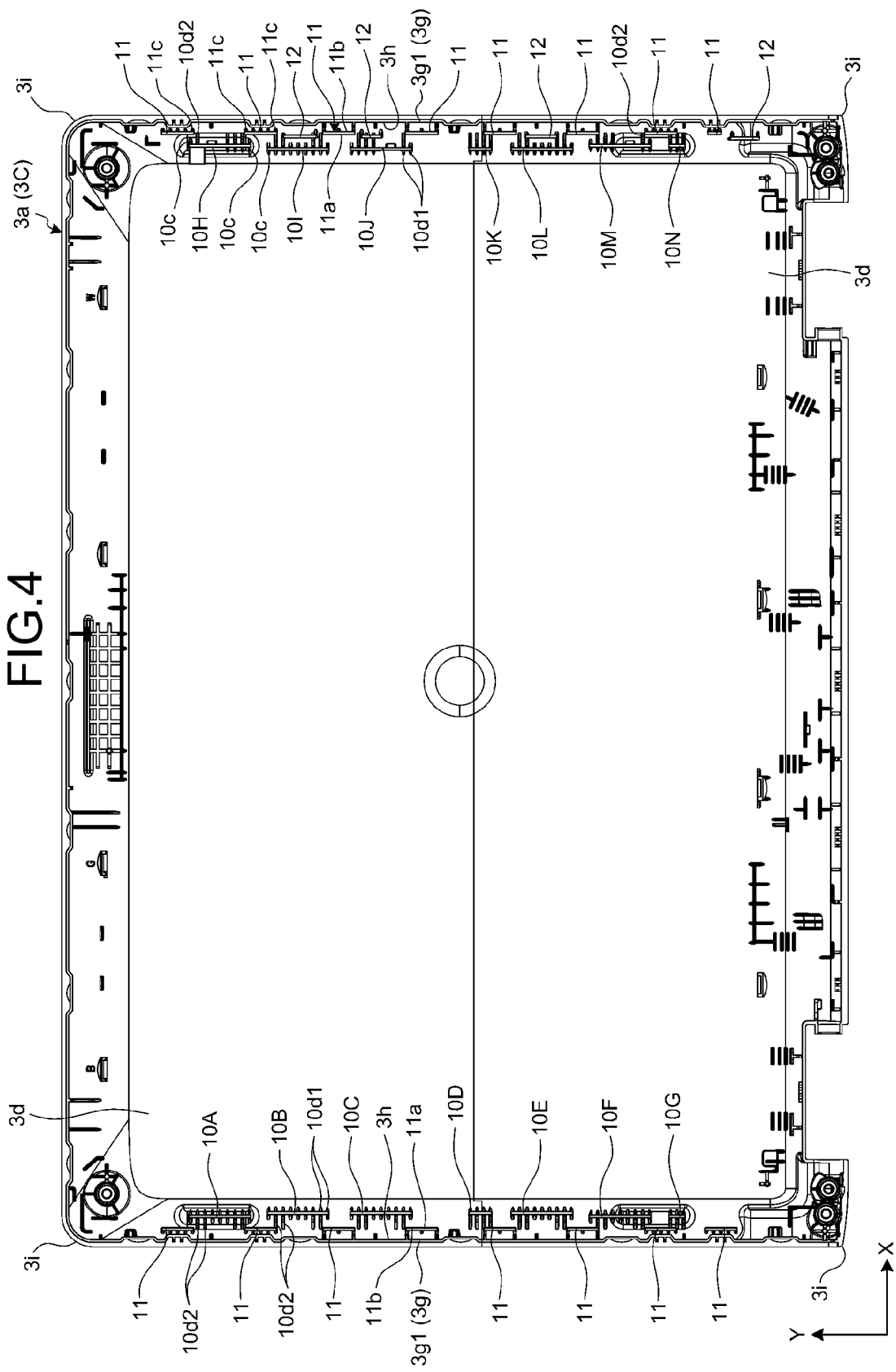

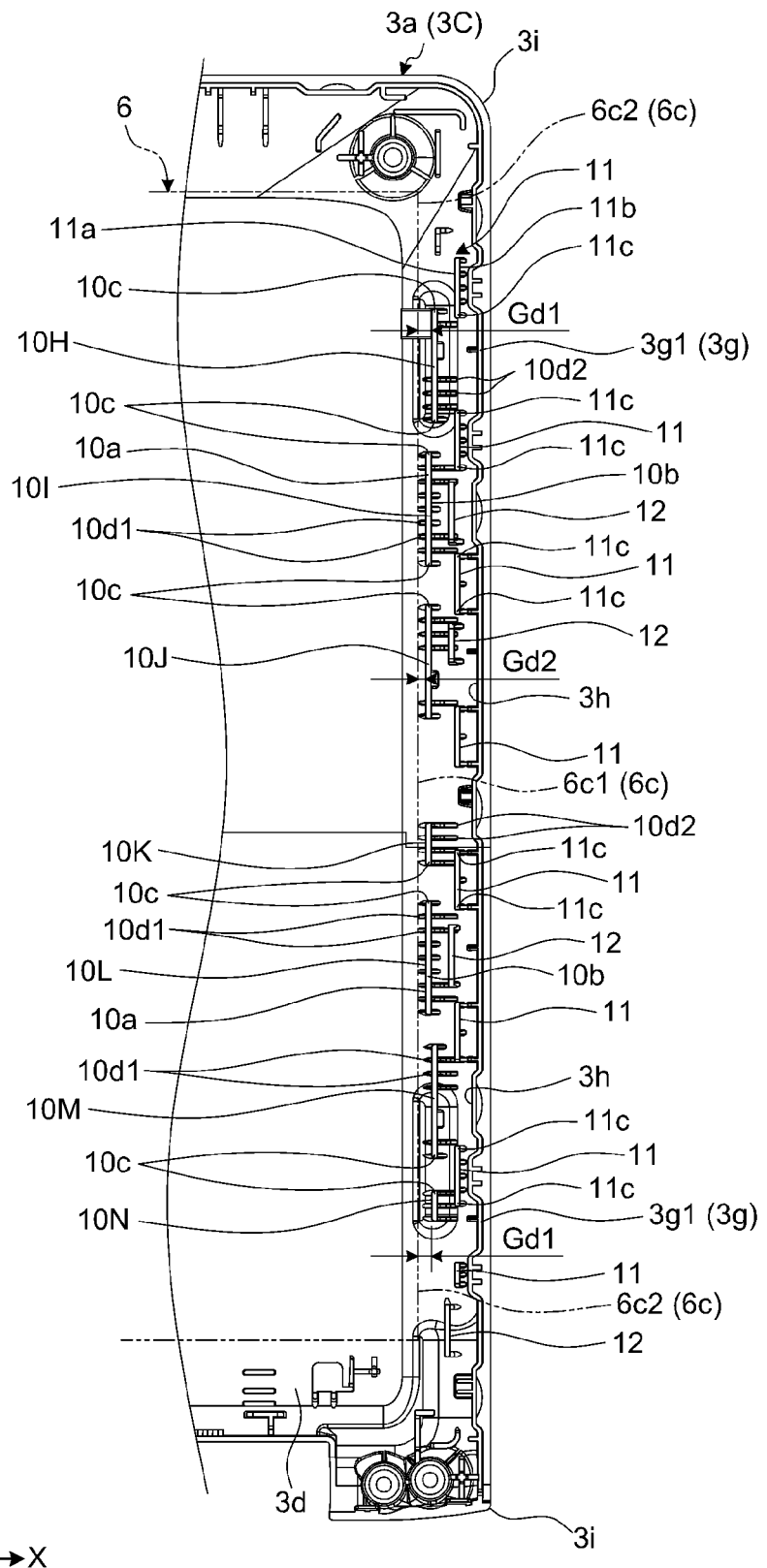

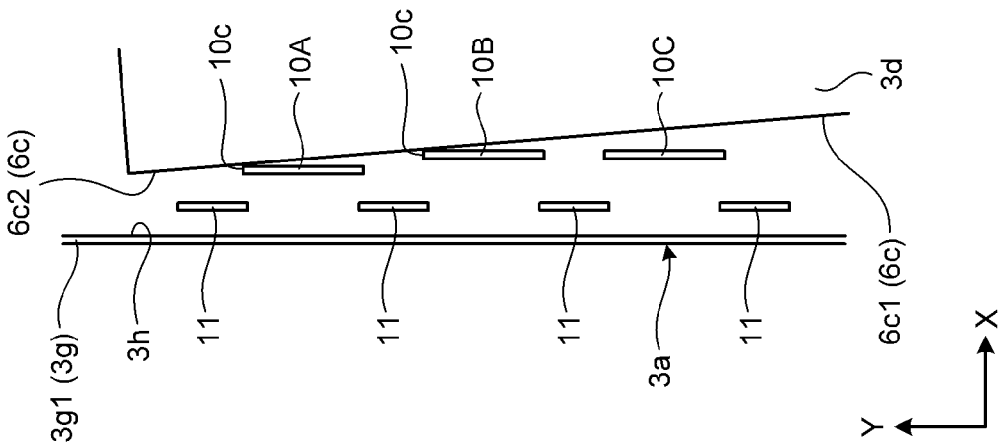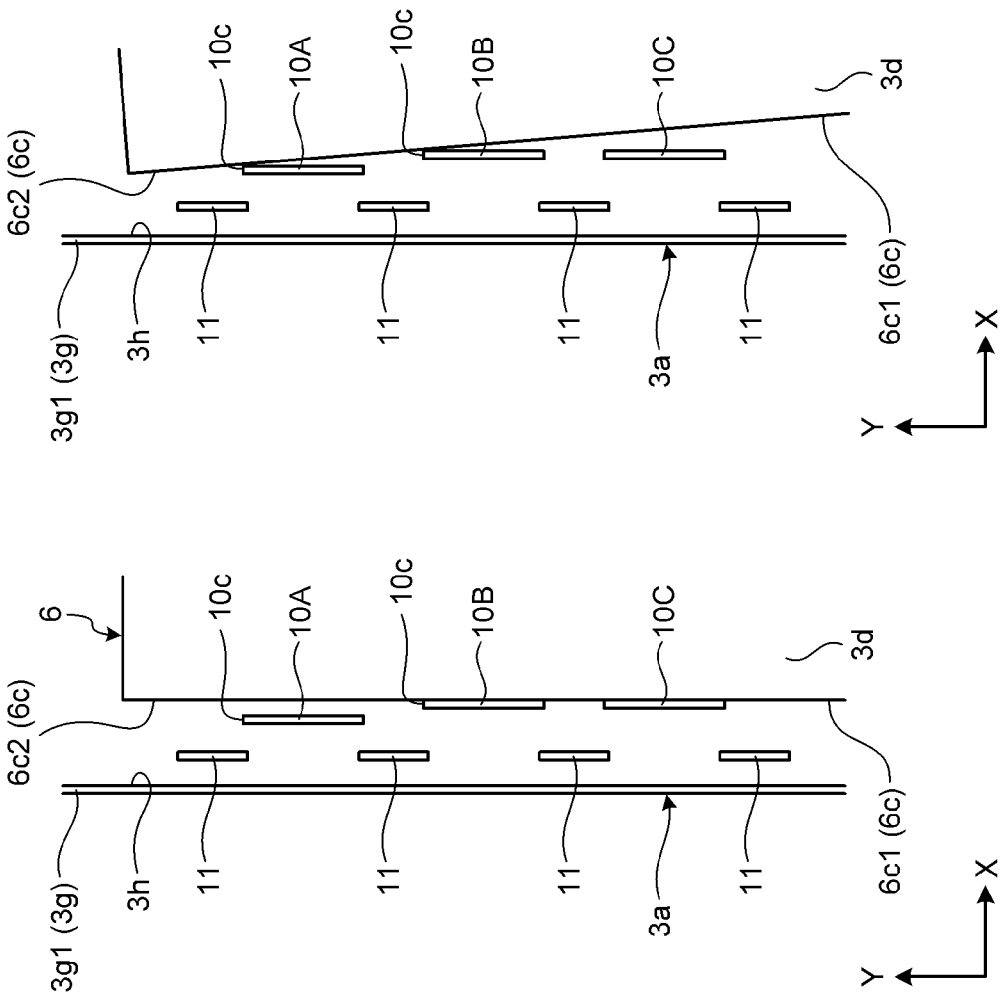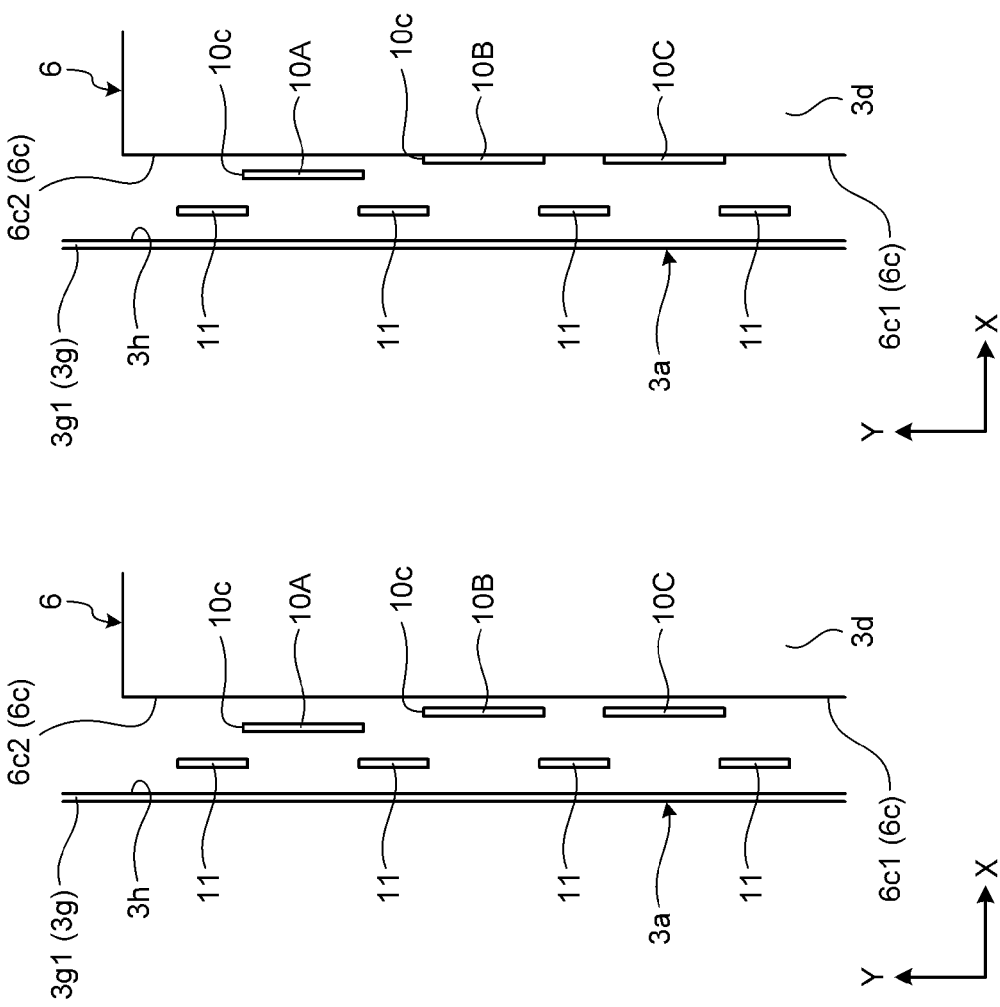

ELECTRONIC DEVICE

CROSS-REFERENCE TO RELATED APPLICATIONS

This application is based upon and claims the benefit of priority from Japanese Patent Application No. 2010-090528, filed Apr. 9, 2010, the entire contents of which are incorporated herein by reference.

FIELD

Embodiments described herein relate generally to an electronic device.

BACKGROUND

There have been known electronic devices provided with a rib in the housing to absorb shock load acting on an electronic component moving in the housing due to an inertial force or the like (see, for example, Patent Application Publication (KOKAI) No. 2008-281644).

This type of electronic devices are required to reduce stress caused by the shock load acting on an electronic component.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 4 is an exemplary plan view of a first divisional body of the second body viewed from the inside of the housing in the embodiment;

FIG. 5 is an exemplary enlarged view of a portion illustrated in FIG. 4 in the first embodiment;

FIGS. 6A to 6C are exemplary plan views of the inside of the housing, schematically illustrating the movement of a display panel in the housing of the second body in the first embodiment;

DETAILED DESCRIPTION

Figure 1:
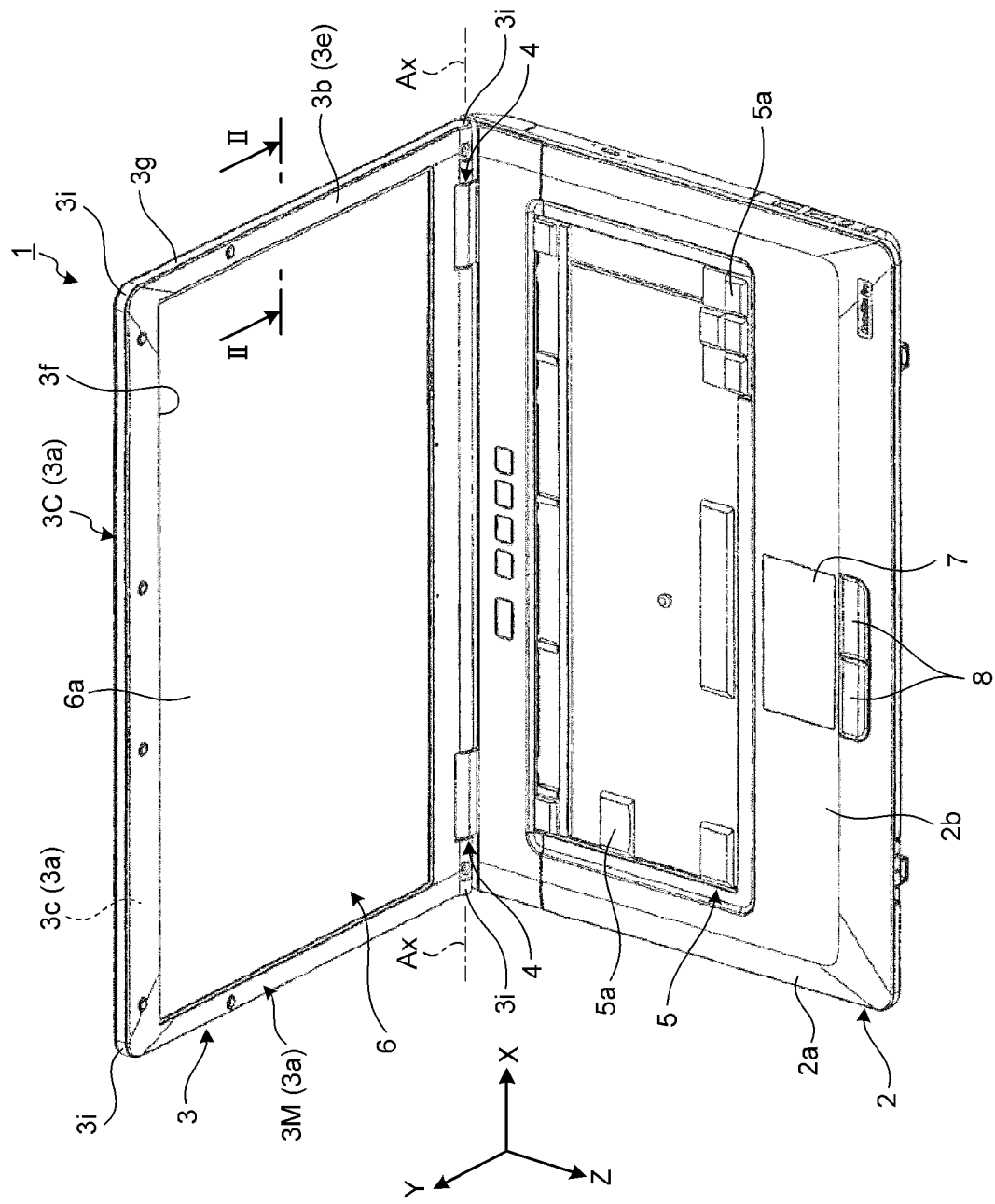
FIG. 1 is an exemplary perspective view of an electronic device according to a first embodiment.

Various embodiments will be described hereinafter with reference to the accompanying drawings. In general, according to one embodiment, an electronic device comprises a housing and a plurality of ribs. The housing is configured to house at least part of an electronic component. The ribs are configured to be arranged along a flat side surface of the electronic component in the housing such that an inner surface of the ribs faces the side surface. The ribs comprises a rib configured to face the side surface of the electronic component, and another rib configured to be located on an edge side of the side surface compared to the rib and more distant from the side surface than the rib.

According to another embodiment, an electronic device comprises a display device, a housing, a first rib, and a second rib. The housing is configured to house the display device, and comprises a corner and a peripheral wall extending continuously from the corner. The first rib is configured to be arranged along the peripheral wall in the housing and located close to the display device. The second rib is configured to be arranged along the peripheral wall in the housing, and located more distant from the display device than the first rib located close to the display device and closer to the corner than the first rib.

In the following, like reference numerals refer to like features of the embodiments, and the same description will not be repeated.

As illustrated in FIG. 1, the electronic device 1 of a first embodiment is, for example, a notebook personal computer. The electronic device 1 comprises a flat rectangular first body 2 and a flat rectangular second body 3. The first body 2 and the second body 3 are connected by a hinge mechanism 4 to be relatively rotatable about a rotation axis Ax between an open position (FIG. 1) and a closed position (not illustrated). Hereinafter, for the sake of convenience of description, the width direction (horizontal direction) of the first body 2 will be referred to as "X direction", the direction of an edge of the second body 3 will be referred to as "Y direction", and the thickness direction of the second body 3 will be referred to as "Z direction". The X, Y, and Z directions are perpendicular to one another.

The first body 2 is provided with a keyboard 5, a pointing device 7, a click button 8, and the like as input devices, which are exposed on a front surface 2b as the outer surface of a housing 2a. On the other hand, the second body 3 is provided with a display panel 6 such as a liquid crystal display (LCD) panel as an electronic component, which is exposed on a front surface 3b as the outer surface of a housing 3a. When the first body 2 and the second body 3 are in the open position, the keyboard 5, the display panel 6, and the like are exposed to allow the user to use them. On the other hand, in the closed position, the front surface 2b closely faces the front surface 3b, and the keyboard 5, the display panel 6, the pointing device 7, the click button 8, and the like are covered between the housings 2a and 3a. Incidentally, FIG. 1 does not illustrate all keys of the keyboard 5 but only keys 5a.

Figure 2:
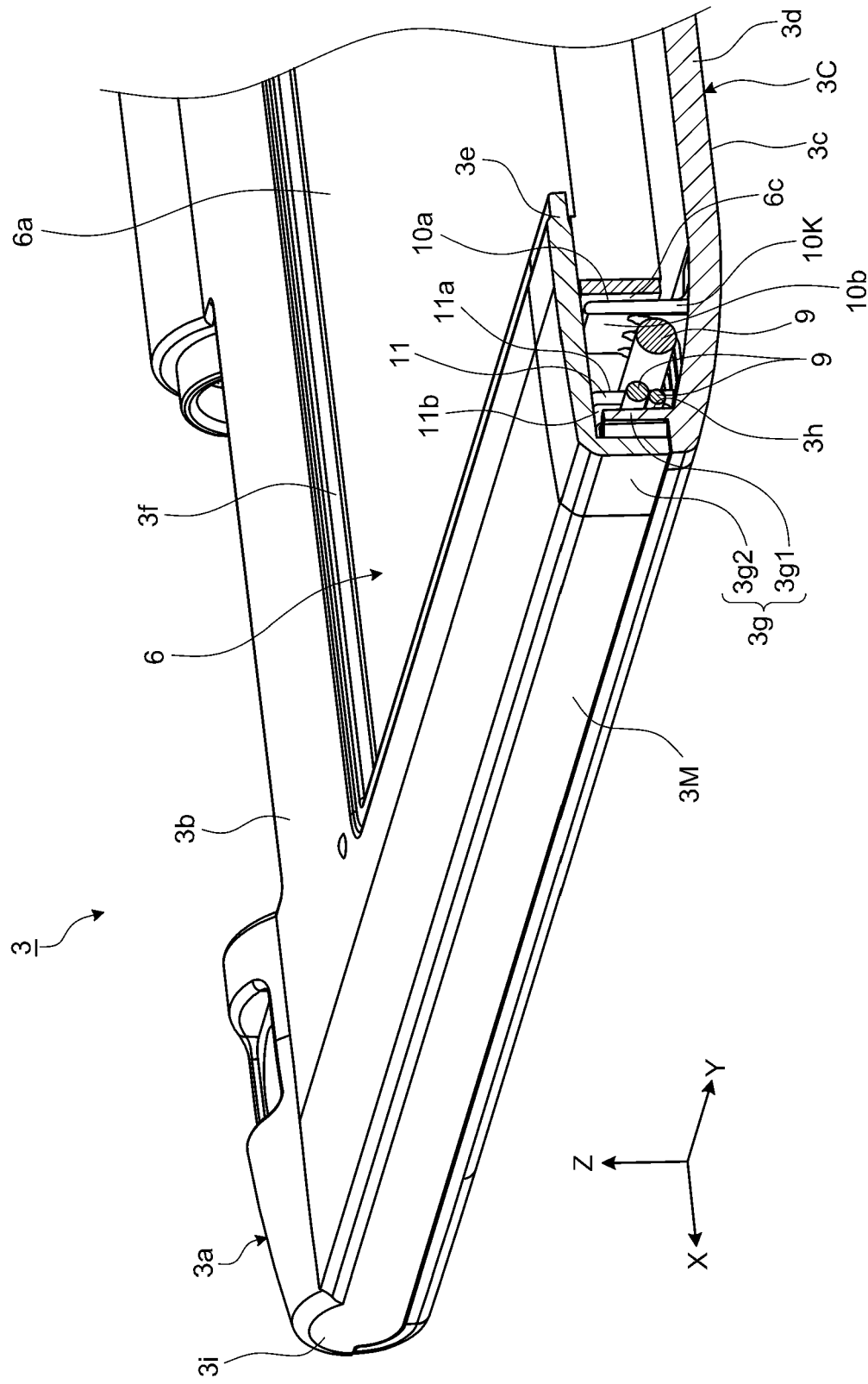
FIG. 2 is an exemplary cross-sectional view taken along line II-II of FIG. 1 in the first embodiment.

As illustrated in FIGS. 1 and 2, the second body 3 has a rectangle shape long in the X direction and short in the Y direction in a plan view from the Z direction, and is flat in the Z direction. The housing 3*a* of the second body 3 comprises a bottom wall 3*d*, a first divisional body 3C, and a second divisional body 3M. The bottom wall 3*d* forms aback surface 3*c*. The first divisional body 3C comprises a side wall (peripheral wall) 3*g*1 that extends at the periphery of the bottom wall 3*d*. The second divisional body 3M comprises a top wall 3*e* that forms the front surface 3*b*, and a side wall (peripheral wall) 3*g*2 that extends at the periphery of the top wall 3*e*. A rectangular opening 3*f* is formed in the center of the front surface 3*b* of the second divisional body 3M (the top wall 3*e*). A front surface 6*a* of the display panel 6 is exposed form the opening 3*f*. The side walls 3*g*1 and 3*g*2 of the first divisional body 3C and the second divisional body 3M overlap one on top of the other and form a side wall (peripheral wall) 3*g* of the housing 3*a*. The outline of the second body 3 is formed of the bottom wall 3*d*, the top wall 3*e*, the side wall 3*g*, and the like. The housing 3*a* comprises a corner 3*i* and the peripheral wall 3*g* that extends continuously from the corner 3*i*. The housing 3*a* is made of metal material, synthetic resin material, or the like.

Figure 3:
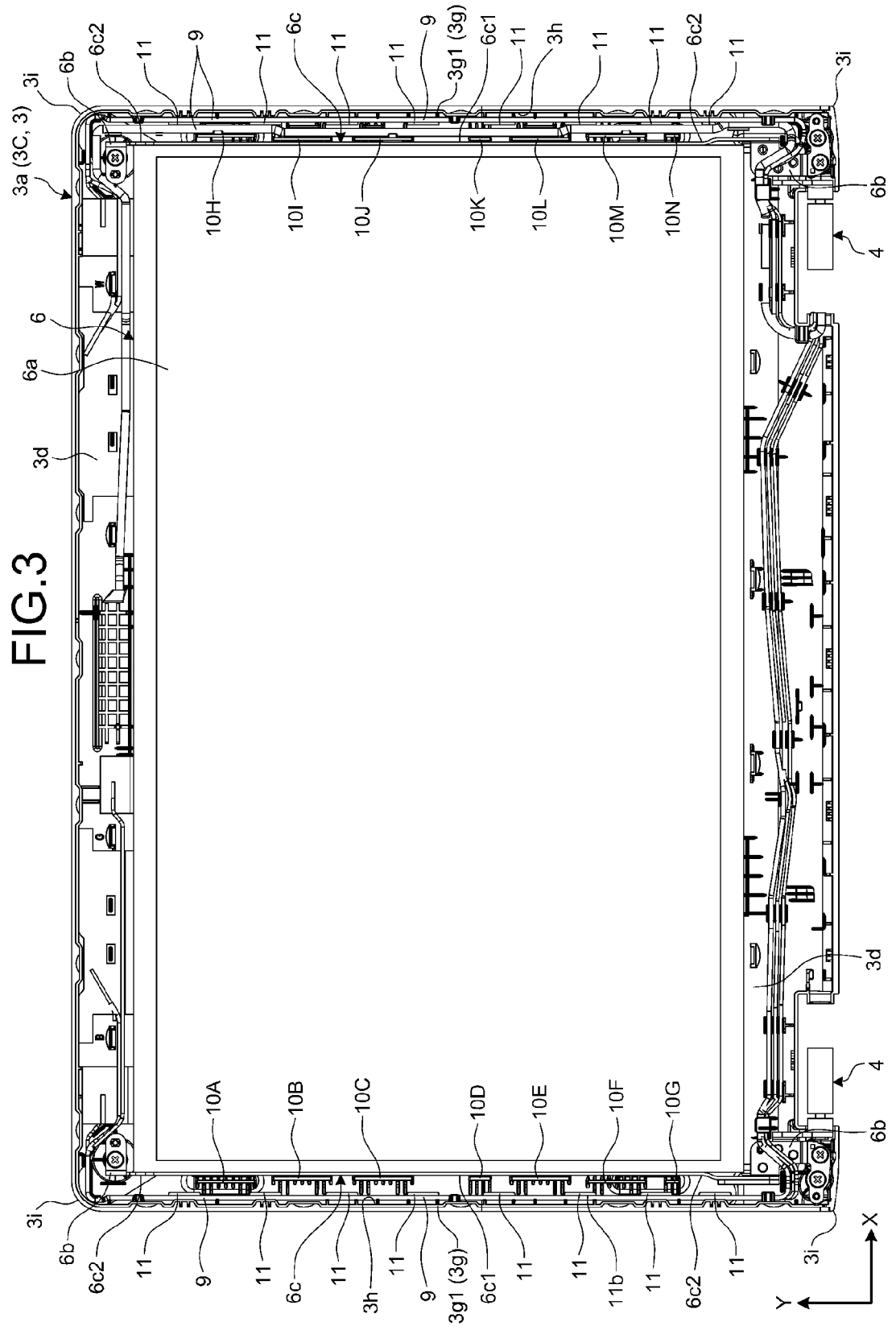
FIG. 3 is an exemplary plan view of the inside of the housing of a second body, illustrating a first divisional body side in the first embodiment.
Figure 7:
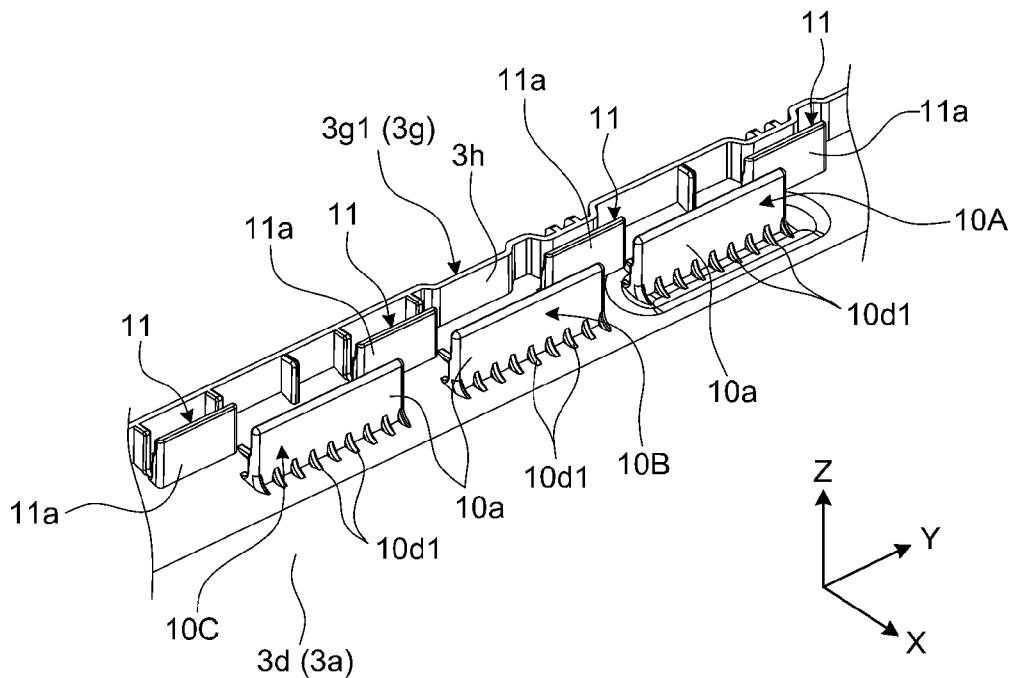
FIG. 7 is an exemplary perspective view of part of a plurality of ribs viewed from the inner side surface side in the first embodiment.

As illustrated in FIG. 3, the display panel 6 is rectangular in a plan view from the Z direction. The display panel 6 is located at substantially the center of the first divisional body 3C. The display panel 6 is attached to the first divisional body 3C by, for example, screwing brackets 6*b* provided at the four corners of the display panel 6. The position (position in the initial or normal state) of the display panel 6 with respect to the first divisional body 3C is defined by the brackets 6*b* or the like. As illustrated in FIG. 2, the display panel 6 is relatively thin and flat, i.e., the thickness (the height in the Z direction) is small.

As illustrated in FIGS. 2 and 3, a cable 9 is routed in an elongated area between the side wall 3*g*1 (the side wall 3*g*) and a strip-like flat component side surface 6*c* of the display panel 6. The side wall 3*g*1 extends along the thickness direction (the Z direction) of the second body 3, and forms a rectangular frame along the periphery of the second body 3. Depending on the location, a plurality of the cables 9 (for example, three cables) are routed in parallel. The cable 9 may be, for example, an antenna cable or a camera cable.

As illustrated in FIGS. 2 to 5, a plurality of ribs 10A to 10N are provided between the side wall 3*g*1 of the first divisional body 3C and the component side surface 6*c* of the display panel 6. In the first embodiment, the elongated ribs 10A to 10N are arranged spaced apart from one another along the component side surface 6*c* with a space therefrom. The ribs 10A to 10N extend in the Z direction (the thickness direction of the second body 3) substantially in parallel with the side wall 3*g*1 on at least one of the bottom wall 3*d* and the top wall 3*e* of the housing 3*a* (in the first embodiment, on the bottom wall 3*d* of the first divisional body 3C as an example). As illustrated in FIGS. 2 and 5, the ribs 10A to 10N comprise an inner surface 10*a* and an outer surface 10*b* opposite the inner surface 10*a*. The inner surface 10*a* faces the component side surface 6*c* of the display panel 6. The outer surface 11*b* faces an inner surface 3*h* of the side wall 3*g*1. As illustrated in FIGS. 3 and 5, the ribs 10A to 10N are located closer to the component side surface 6*c* of the display panel 6 than the side wall 3*g*1.

In the first embodiment, as illustrated in FIGS. 3 to 5, among the ribs 10A to 10N, the ribs 10A, 10F, 10G, 10H, 10M, and 10N located to face an edge 6*c*2 of the component side surface 6*c* in the longitudinal direction (the Y direction) are closer to the side wall 3*g*1 and more distant from the component side surface 6*c* than the ribs 10B to 10E and 10I to 10L located to face a middle portion 6*c*1 of the component side surface 6*c* in the longitudinal direction (the Y direction). In the first embodiment, the ribs 10B to 10E and 10I to 10L are located to face an area across the center of the of the component side surface 6*c* in the longitudinal direction. That is, a space (distance) Gd1 between the ribs 10A, 10F, 10G, 10H, 10M, and 10N and the component side surface 6*c* is larger than a space (distance) Gd2 between the ribs 10B to 10E and 10I to 10L and the component side surface 6*c* (see FIG. 5). The ribs 10A, 10F, 10G, 10H, 10M, and 10N, 10B to 10E, and 10I to 10L are aligned in parallel with the component side surface 6*c*. The middle portion 6*c*1 corresponds to an area between the edges 6*c*2 of the component side surface 6*c* on both sides in the longitudinal direction.

In the first embodiment, as illustrated in FIGS. 3 to 5, between the component side surface 6*c* of the display panel 6 and the side wall 3*g*1 of the first divisional body 3C, a plurality of second ribs 11 are provided along the side wall 3*g*1 at a position closer to the side wall 3*g*1 than the ribs 10A to 10N (a position distant from the component side surface 6*c*). The second ribs 11 are arranged spaced apart from one another in a line on both sides of the display panel 6 in the width direction. The second ribs 11 extend in the Z direction (the thickness direction of the second body 3) substantially in parallel with the side wall 3*g*1 on at least one of the bottom wall 3*d* and the top wall 3*e* of the housing 3*a* (in the first embodiment, on the bottom wall 3*d* of the first divisional body 3C as an example). As illustrated in FIGS. 2 and 5, the second ribs 11 comprise an inner surface 11*a* and an outer surface 11*b* opposite the inner surface 11*a*. The inner surface 11*a* faces the component side surface 6*c* of the display panel 6. The outer surface 11*b* faces the inner surface 3*h* of the side wall 3*g*1. As illustrated in FIGS. 2 and 3, the cable 9 is routed between the side wall 3*g*1 and the second ribs 11.

In the first embodiment, as illustrated in FIGS. 3 to 5, the ribs 10A to 10N and the second ribs 11 are alternately arranged along the component side surface 6*c*. As illustrated in FIG. 3, the cable 9 is routed between the second ribs 11 and the ribs 10H to 10N arranged along the component side surface 6*c* on the right side of the display panel 6 in FIG. 3. As illustrated in FIGS. 4 and 5, an end 10*c* of each of the ribs 10A to 10N overlaps an end 11*c* of adjacent one of the second ribs 11 in a direction perpendicular to the component side surface 6*c* (i.e., the X direction).

As illustrated in FIG. 5, in the first embodiment, third ribs 12 are arranged space apart from one another on the display panel 6 opposite the ribs 10I, 10J, and 10L among the ribs 10H to 10N arranged along the component side surface 6*c* on the right side of the display panel 6 in FIG. 3, i.e., on the side wall 3*g*1 side, in parallel with the ribs 10I, 10J, and 10L. The third ribs 12 extend in the Z direction (the thickness direction of the second body 3) substantially in parallel with the side wall 3*g*1 on at least one of the bottom wall 3*d* and the top wall 3*e* of the housing 3*a* (in the first embodiment, on the bottom wall 3*d* of the first divisional body 3C as an example). The third ribs function as the guide of the cable 9 routed between the ribs 10A to 10N and the second ribs 11.

For example, when the electronic device 1 accidentally falls onto the floor or the like, the display panel 6 may relatively move toward the side wall 3*g* in the housing 3*a* due to an inertial force acting on the display panel 6. In such a case, the ribs 10A to 10N have the function of absorbing shock load on the display panel 6. That is, when the electronic device 1 falls or the like, if the display panel 6 relatively moves toward the side wall 3*g* in the housing 3*a* along with the deformation of the periphery of the brackets 6*b* or other parts, the display panel 6 may come in contact with the ribs 10A to 10N. In such a case, in the first embodiment, the ribs 10A to 10N are deformed by the contact or pressure of the display panel 6 to absorb the energy. Thus, it is possible to reduce the shock load relatively acting on the display panel 6 from the housing 3a (the side wall 3g, the ribs 10A to 10N, etc.).

The ribs 10A to 10N also have the function of protecting the cable 9. As described above, when the electronic device 1 falls or the like, if the display panel 6 relatively moves toward the side wall 3g in the housing 3a along with the deformation of the periphery of the brackets 6b (see FIG. 3) or other parts, the display panel 6 may come in contact with the ribs 10A to 10N. In the first embodiment, the ribs 10A to 10N are located between the display panel 6 and the cable 9. Thus, even if, for example, the cable 9 comes in contact with the display panel 6 or is caught between the display panel 6 and the side wall 3g, the cable 9 can be prevented from being damaged.

In the following, a description will be given of the absorption of shock load by the ribs 10A to 10N. FIGS. 6A to 6C illustrates the movement of the display panel 6. FIG. 6A illustrates the display panel 6 in the normal state (initial state). As illustrated in FIG. 6A, in the normal state, the component side surface 6c of the display panel 6 is located in parallel to the ribs 10B and 10C. FIG. 6B illustrates the state where the display panel 6 relatively moves in parallel in the X direction without a tilt in the housing 3a due to an inertial force or the like acting on the display panel 6 and comes in contact with the ribs 10B and 10C. In this case, as illustrated in FIG. 6B, the component side surface 6c of the display panel 6 is in contact with the ribs 10B and 10C. In this manner, in the first embodiment, when the display panel 6 moves toward the side wall 3g without a tilt, the ribs 10B and 10C receives the load from the display panel 6, which facilitates the dispersal of the load. This facilitates to reduce stress caused by the shock load acting on the display panel 6. Although not illustrated in FIG. 6B, when the display panel 6 moves without a tilt, the other ribs 10D, 10E, and 10I to 10L than the ribs 10B and 10C operate in a similar manner to the ribs 10B and 10C.

On the other hand, as illustrated in FIG. 6C, there is a case where the display panel 6 moves toward the side wall 3g while being tilted. In this case, the display panel 6 comes close to the side wall 3g in a posture in which the edge 6c2 of the component side surface 6c in the longitudinal direction is closer to the side wall 3g than the middle portion 6c1. In the first embodiment, as described above, the rib 10A facing the edge 6c2 of the component side surface 6c is more spaced apart from the display panel 6 than the ribs 10B and 10C facing the middle portion 6c1. Accordingly, the tilting display panel 6 comes in contact with the ribs 10A and 10B as illustrated in FIG. 6c. The ribs 10A and 10B facilitates the dispersal of the load from the display panel 6, thereby facilitating to reduce stress caused by the shock load acting on the display panel 6. Although not illustrated in FIG. 6C, when the display panel 6 moves while being tilted, the other ribs 10E to 10G, 10H, 10I, and 10L to 10N than the ribs 10A and 10B operate in a similar manner to the ribs 10A and 10B. Incidentally, with respect to the other ribs 10E to 10G, 10H, 10I, and 10L to 10N, the display panel 6 comes close to the side wall 3g in a posture in which the edge 6c2 of the component side surface 6c in the longitudinal direction is closer to the side wall 3g than the middle portion 6c1. In other words, the display panel 6 comes close to the side wall 3g in a posture in which, from the normal state, the edge 6c2 of the component side surface 6c in the longitudinal direction moves more than the middle portion 6c1.

Figure 8:
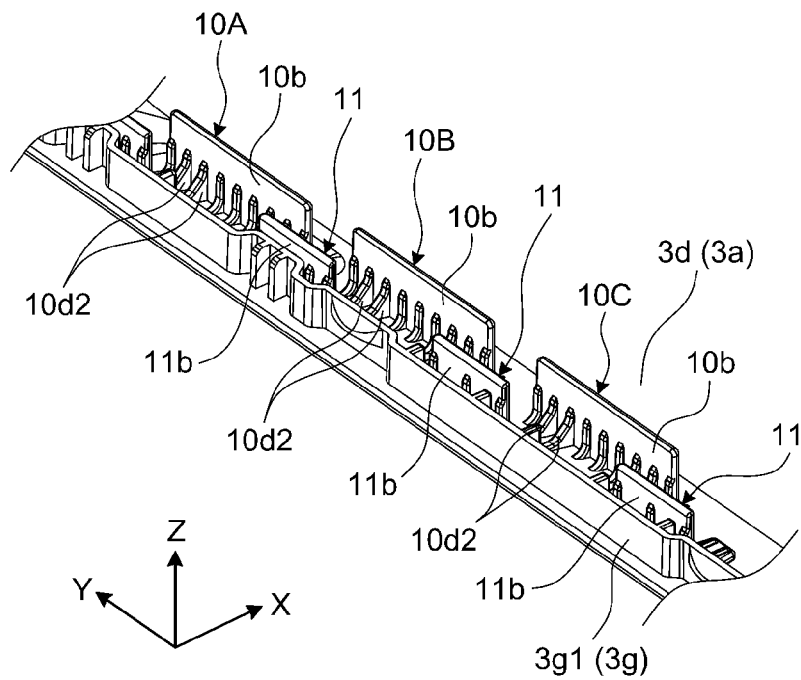
FIG. 8 is an exemplary perspective view of part of the ribs illustrated in FIG. 8 viewed from the outer side surface side in the first embodiment.

In the first embodiment, as illustrated in FIGS. 7 to 10, rectangular reinforcing ribs 10d1 and 10d2 are provided to the base of each of the ribs 10A to 10N (FIGS. 7 to 10 illustrate only the ribs 10A to 10C and 10H to 10J) to improve the rigidity and the strength. The reinforcing ribs 10d1 and 10d2 are connected to the ribs 10A to 10N and the bottom wall 3d. The energy absorption capability of the ribs 10A to 10N can be adjusted by the specifications (number, size, location, etc.) of the reinforcing ribs 10d1 and 10d2. For example, as illustrated in FIG. 8, with respect to the ribs 10A to 10C, the reinforcing rib 10d2 located on the end side in the Y direction (on the side of the edge 6c2 of the component side surface 6c in the longitudinal direction) and opposite the display panel 6 may be larger than the reinforcing rib 10d1. As illustrated in FIG. 6C, when the display panel 6 moves in the housing 3a due to an inertial force or the like while being tilted and comes in contact with the ribs 10A and 10B, the display panel 6 comes in contact with the end 10c of each of the ribs 10A and 10B on the side of the edge 6c2 in the longitudinal direction. Accordingly, if the reinforcing rib 10d2 located on the side of the edge 6c2 is large, it is possible to prevent the reduction of the effect of stopping the movement of the display panel 6 by the ribs 10A to 10N due to the low rigidity of the ribs 10A to 10N.

All the ribs 10A to 10N, the second ribs 11, and the third ribs 12 have plane surfaces, respectively, on the side coming in contact with the cable 9. In other words, the outer surface 10b of the ribs 10A to 10N, the inner surface 11a of the second ribs 11, and an outer surface 12a of the third ribs 12 (see FIG. 9) are all flat. The plane surfaces prevent the cable 9 from being concentrically loaded, and thus the cable 9 is not easily damaged.

Figure 9:
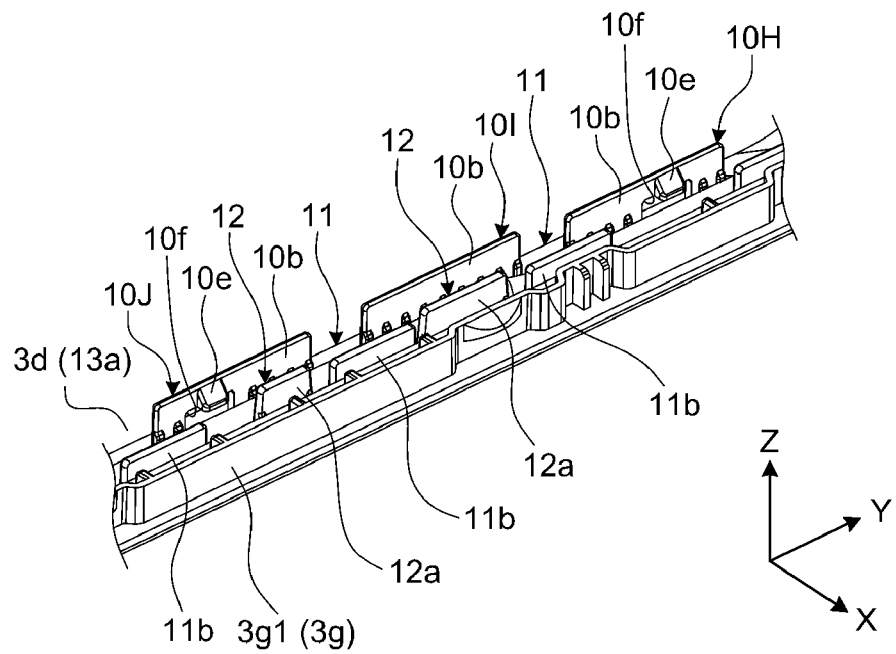
FIG. 9 is an exemplary perspective view of another part of the ribs viewed from the outer side surface side in the first embodiment.
Figure 10:
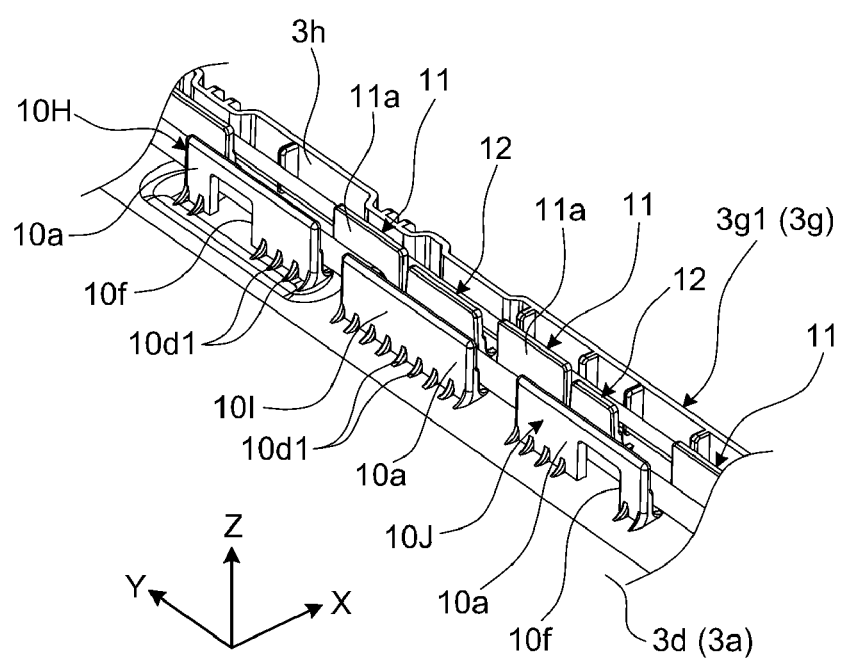
FIG. 10 is an exemplary perspective view of another part of the ribs viewed from the inner side surface side in the first embodiment.

As illustrated in FIGS. 5 and 9, among the ribs 10H to 10N configured to be in contact with the cable 9, the ribs 10H, 10J, and 10M are provided with a claw 10e. As illustrated in FIG. 9, the claw 10e extends from the upper portion of the ribs 10H, 10J, and 10M toward the side wall 3g on the user side of the cable 9 routed adjacent to the ribs 10H, 10J, and 10M. As illustrated in FIG. 5, the claw 10e is provided to the ribs 10H, 10J, and 10M with a relatively long section where the second ribs 11 facing the side wall 3g do not exist among the ribs 10H to 10N. The claw 10e improves the retention of the cable 9. When a slide type that allows sliding in the X direction is used with an integral type in the Z direction to form the claw 10e in the housing 3a, a through hole 10f is formed by the slide type below the claw 10e.

As described above, according to the first embodiment, the electronic device 1 comprises the housing 3a that houses therein at least part of the display panel 6 as an electronic component and the ribs 10A to 10N arranged along the flat component side surface 6c of the display panel 6 such that the inner surface 10a faces the component side surface 6c. Among the ribs 10A to 10N, the ribs 10B to 10E and 10I to 10L face the component side surface 6c, while the ribs 10A, 10F, 10G, 10H, 10M, and 10N are located on the side of the edge 6c2 of the component side surface 6c and more distant from the component side surface 6c compared to the ribs 10B to 10E and 10I to 10L. In the first embodiment, for example, the ribs 10A, 10F, 10G, 10H, 10M, and 10N located to face the edge 6c2 of the component side surface 6c are more distant from the component side surface 6c than the ribs 10B to 10E and 10I to 10L located to face the middle portion 6c1. Accordingly, a combination of a plurality of ribs (in the first embodiment, for example, the ribs 10A and 10B, the ribs 10E to 10G, the ribs 10H and 10I, and the ribs 10L to 10N) can receive the display panel 6 moving while being tilted. That is, even if the display panel 6 moves while being tilted, a plurality of ribs receive the load from the display panel 6, which facilitates the dispersal of the load. This facilitates to reduce stress caused by the shock load acting on the display panel 6.

According to the first embodiment, the ribs 10B to 10E and 10I to 10L are located to face the middle portion 6c1 of the component side surface 6c with the same space from the component side surface 6c. Accordingly, even if the display panel 6 moves toward the side wall 3g without a tilt, a plurality of ribs (in the first embodiment, for example, a combination of the ribs 10B to 10E or a combination of the ribs 10I and 10L) receive the load from the display panel 6, which facilitates the dispersal of the load. This facilitates to reduce stress caused by the shock load acting on the display panel 6.

According to the first embodiment, the side wall 3g that constitutes at least part of the outline of the housing 3a is provided on a side of the component side surface 6c opposite the ribs 10A to 10N. Further, the cable 9 is routed between the ribs 10A to 10N and the side wall 3g. Accordingly, even if the display panel 6 moves towards the side wall 3g in the housing 2a, the ribs 10A to 10N protects the cable 9.

According to the first embodiment, the ribs 10A, 10F, 10G, 10H, 10M, and 10N located to face the edge 6c2 of the component side surface 6c are aligned in parallel with the component side surface 6c. Thus, the ribs 10A, 10F, 10G, 10H, 10M, and 10N can easily be used as a guide to route the cable 9 between them and the side wall 3g compared to the case where the ribs 10A, 10F, 10G, 10H, 10M, and 10N are inclined toward the side wall 3g.

According to the first embodiment, the second ribs 11 are provided along the side wall 3g at a position closer to the side wall 3g than the ribs 10A to 10N. The cable 9 is routed between the second ribs 11 and the side wall 3g. Accordingly, the cable 9 can be routed in a position more distant from the display panel 6 than the ribs 10A to 10N, which further increases the protection of the cable 9. Besides, the second ribs 11 further increases the protection of the cable 9.

According to the first embodiment, the ribs 10A to 10N and the second ribs 11 are alternately arranged along the component side surface 6c. If the ribs 10A to 10N and the second ribs 11 are arranged not alternately and a space between the ribs 10A to 10N overlaps a space between the second ribs 11 in the width direction (the X direction), the rigidity of a portion of the housing 3a corresponding to the space is lower than that of a portion of the housing 3a provided with the ribs 10A to 10N and the second ribs 11. Accordingly, the housing 3a may warp from the portion corresponding to the space as the origin of the warp. In the first embodiment, since the ribs 10A to 10N and the second ribs 11 are alternately arranged along the component side surface 6c, it is possible to reduce points with relatively low rigidity. Thus, the rigidity of the periphery of the housing 3a can be improved in a wider range.

According to the first embodiment, the cable 9 is routed between the ribs 10A to 10N and the second ribs 11. Thus, using a space between the ribs 10A to 10N and the second ribs 11 as the route of the cable 9, more cables (9) can be routed.

According to the first embodiment, the end 10c of at least one of the ribs 10A to 10N (in the first embodiment, the ribs 10A to 10N) overlaps the end 11c of at least one of the second ribs 11 (in the first embodiment, the second ribs 11 adjacent to the ribs 10A to 10N) in a direction perpendicular to the component side surface 6c. The ends 10c and 11c facilitate to retain the cable 9, which improves the retention of the cable 9 by the housing 3a.

Figure 11:
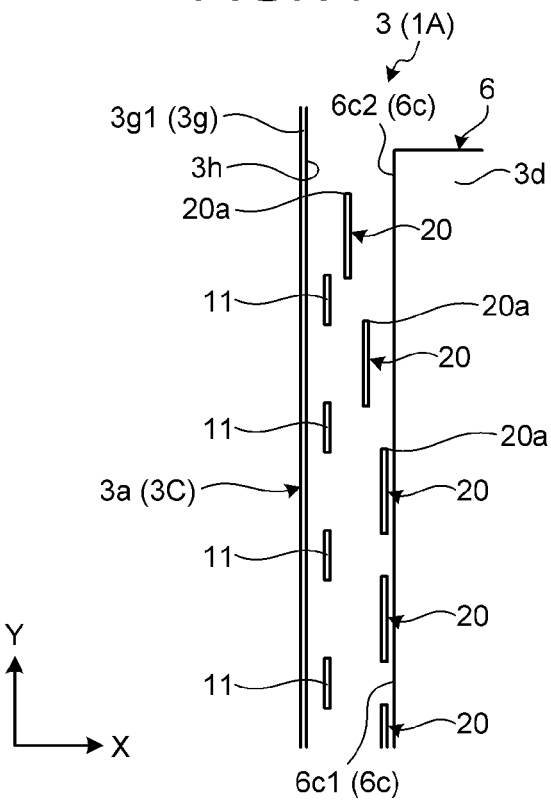
FIG. 11 is an exemplary plan view of the inside of the housing of a second body of an electronic device, schematically illustrating a first divisional body side according to a second embodiment.

FIG. 11 illustrates part of an electronic device 1A according to a second embodiment. The electronic device 1A is of basically the same configuration as the electronic device 1 of the first embodiment except the presence of ribs 20 in place of the ribs 10A to 10N. In the second embodiment, the ribs 20 are arranged in three arrays such that the ribs 20 are separate from the component side surface 6c of the display panel 6 by different distances. With this configuration, the ribs 20 can also receive the display panel 6 moving while being tilted, which facilitates the dispersal of the load. This facilitates to reduce stress caused by the shock load acting on the display panel 6. Although FIG. 11 illustrates an example in which the ribs 20 are arranged in three arrays, the ribs may be arranged in four arrays. Besides, for example, an end 20a of the ribs 20 may be arranged in an arc pointing toward the display panel 6 to correspond to various tilt angles of the display panel 6. That is, by setting the arrangement of the ribs 20 as required, stress caused by the shock load can be further easily reduced.

Figure 12:
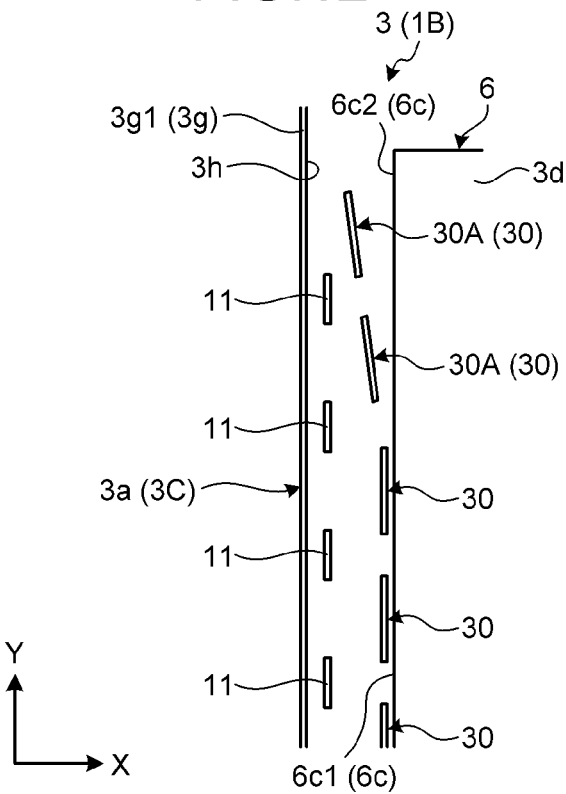
FIG. 12 is an exemplary plan view of the inside of the housing of a second body of an electronic device, schematically illustrating a first divisional body side according to a third embodiment.

FIG. 12 illustrates part of an electronic device 1B according to a third embodiment. The electronic device 1B is of basically the same configuration as the electronic device 1 of the first embodiment except the presence of ribs 30 in place of the ribs 10A to 10N. In the third embodiment, at least part of the ribs 30, specifically a plurality of ribs 30A facing the edge 6c2 of the component side surface 6c, is arranged to be tilted such that the distance to the component side surface 6c increases from the middle portion 6c1 side toward the edge 6c2 side. With this configuration, the tilted display panel 6 can be further easily received with a wider range of the ribs 30A arranged to be tilted, which facilitates the dispersal of the load. This facilitates to reduce stress caused by the shock load acting on the display panel 6. The tilt angle of the ribs 30 may be changed as required. Besides, ribs tilted in an arc may be provided.

Figure 13:
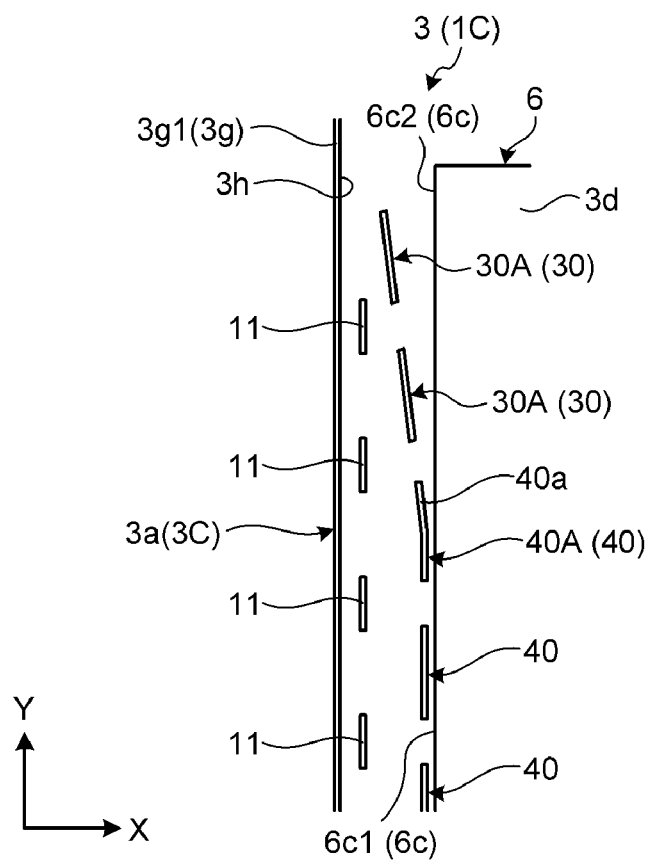
FIG. 13 is an exemplary plan view of the inside of the housing of a second body of an electronic device, schematically illustrating a first divisional body side according to a fourth embodiment.

FIG. 13 illustrates part of an electronic device 1C according to a fourth embodiment. The electronic device 1C is of basically the same configuration as the electronic device 1 of the first embodiment except the presence of the ribs 30 (the ribs 30A) and 40 in place of the ribs 10A to 10N. In the fourth embodiment, at least part of the ribs 40, a rib 40A, is arranged to be tilted such that the distance to the component side surface 6c increases from the middle portion 6c1 side toward the edge 6c2 side. With this configuration, the tilted display panel 6 can be further easily received with a tilt section 40a (which can be referred to in various embodiments as a second portion or a fourth portion) of the rib 40A (which can be referred to in various embodiments as a first portion or a second portion) arranged to be tilted, which facilitates the dispersal of the load. This facilitates to reduce stress caused by the shock load acting on the display panel 6. The bending angle of the ribs 40 may be changed as required, and a rib bent in an arc may be provided. Besides, a rib bent at a plurality of points may be provided.

The foregoing embodiments are susceptible to considerable variation in their practice. For example, while the embodiments are described above as being applied to a notebook personal computer, the embodiments may be applied to other electronic devices. The ribs may be provided to another side surface of the electronic component, and ribs may be provided for another electronic component than the display panel. The specifications (location, form, structure, assembly structure, size, length, height, width, space, tilt angle, bent posture, etc.) can be changed as required for at least one of the first connector and the second connector. In addition, the specification (form, number, shape, location, size, material, etc.) can be changed as required for the electronic component, the housing, the display panel, the ribs, the second ribs, the third ribs, and the like.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic device comprising:
   an electronic component including edges and a pair of side surfaces extending in parallel to each other from the edges;
   a housing configured to house at least part of the electronic component;
   a plurality of first ribs, at least one of the first ribs facing one of the pair of side surfaces in the housing; and
   a plurality of second ribs, at least one of the second ribs facing the other of the pair of side surfaces in the housing, wherein
   the first ribs are arranged such that distances between the first ribs and the one of the pair of side surfaces increase from a middle side of the one of the pair of side surfaces toward a first one of the edges, and
   the second ribs are arranged such that distances between the second ribs and the other of the pair of side surfaces increase from a middle side of the other of the pair of side surfaces toward a second one of the edges.

2. The electronic device of claim 1, further comprising a third rib located in the housing, the third rib being located opposite the electronic component with respect to one of the first rib and the second ribs
   along one of the pair of side surfaces of the electronic component facing the one of the first rib and the second rib.

3. The electronic device of claim 2, further comprising a cable passing between the first ribs and the third rib or between the second ribs and the third rib.

4. An electronic device comprising:
   a display including edges and a pair of side surfaces extending in parallel to each other from the edges;
   a housing configured to house the display;
   a first rib positioned in the housing and having a first portion facing one of the pair of side surfaces and a second portion extending continuously from the first portion toward a first one of the edges, the second portion bending in a direction in which a distance between the one of the pair of side surfaces and the second portion increases toward the first one of the edges; and
   a second rib positioned in the housing and having a third portion facing the other of the pair of side surfaces and a fourth portion extending continuously from the third portion toward a second one of the edges, the fourth portion bending in a direction in which a distance between the other of the pair of side surfaces and the fourth portion increases toward the second one of the edges.

5. The electronic device of claim 4, further comprising a cable at least part of which passes along one of the pair of the side surfaces of the display, wherein one of the first rib and the second rib facing the one of the pair of the side surfaces is disposed between the display and the cable.

6. The electronic device of claim 4, wherein
   the housing has a peripheral wall including corners,
   the first rib is positioned nearer to a first one of the corners and is positioned proximal to the one of the pair of side surfaces of the display, and
   the second rib is positioned nearer to a second one of the corners and is positioned proximal to the other of the pair of side surfaces of the display.

7. The electronic device of claim 4, further comprising a third rib located in the housing, the third rib being located opposite the display with respect to one of the first rib and the second rib along one of the pair of side surfaces of the display facing the one of the first rib and the second rib.

8. The electronic device of claim 7, wherein the third rib has a length along a longitudinal direction of the one of the pair of side surfaces shorter than a length along the longitudinal direction of the one of the first rib and the second rib.

9. An electronic device comprising:
   a display including edges and a pair of side surfaces extending in parallel to each other from the edges;
   a housing configured to house the display;
   a first rib positioned in the housing and facing one of the pair of side surfaces, the first rib extending in a direction in which a distance between the one of the pair of side surfaces and the first rib increases toward a first one of the edges; and
   a second rib positioned in the housing and facing the other of the pair of side surfaces, the second rib extending in a direction in which a distance between the other of the pair of side surfaces and the second rib increases toward a second one of the edges.

10. The electronic device of claim 9, further comprising a cable at least part of which passes along one of the pair of the side surfaces of the display, wherein one of the first rib and the second rib facing the one of the pair of the side surfaces is disposed between the display and the cable.

11. The electronic device of claim 9, wherein
    the housing has a peripheral wall including corners,
    the first rib is positioned nearer to a first one of the corners and is positioned proximal to the one of the pair of side surfaces of the display, and
    the second rib is positioned nearer to a second one of the corners and is positioned proximal to the other of the pair of side surfaces of the display.

12. The electronic device of claim 9, further comprising a third rib located in the housing, the third rib being located opposite the display with respect to one of the first rib and the second rib along one of the pair of side surfaces of the display facing the one of the first rib and the second rib.

13. The electronic device of claim 12, wherein the third rib has a length along a longitudinal direction of the one of the pair of side surfaces shorter than a length along the longitudinal direction of the one of the first rib and the second rib.

14. An electronic device comprising:
    a display including edges and a pair of side surfaces extending in parallel to each other from the edges;
    a housing configured to house the display;
    a first rib positioned in the housing along one of the pair of side surfaces;
    second ribs positioned in the housing and arranged along the first rib and the one of the pair of side surfaces such that distances between the display and the second ribs increase toward a first one of the edges;
    a third rib positioned in the housing along the other of the pair of side surfaces; and
    fourth ribs positioned in the housing and arranged along the third rib and the other of the pair of side surfaces such that distances between the display and the fourth ribs increase toward a second one of the edges.

15. The electronic device of claim 14, further comprising a cable at least part of which passes along one of the pair of the side surfaces of the display, wherein one of the second rib and the fourth rib facing the one of the pair of the side surfaces is disposed between the display and the cable.

16. The electronic device of claim 14, wherein the housing has a peripheral wall including corners, the second ribs are positioned nearer to a first one of the corners and is positioned proximal to the one of the pair of side surfaces of the display, and the fourth ribs are positioned nearer to a second one of the corners and is positioned proximal to the other of the pair of side surfaces of the display.

17. The electronic device of claim 14, further comprising a fifth rib located in the housing, the firth rib being located opposite the display with respect to one of the second rib and the fourth rib along one of the pair of side surfaces of the display facing the one of the second rib and the fourth rib.

18. The electronic device of claim 17, wherein the fifth rib has a length along a longitudinal direction of the one of the pair of side surfaces shorter than a length along the longitudinal direction of one of the first rib, the second rib, the third rib, and the fourth rib.

* * * * *